United States Patent [19]

Pelletier et al.

[11] Patent Number: 4,524,607
[45] Date of Patent: Jun. 25, 1985

[54] SYSTEM AND METHOD FOR LOCATING LEAKING TUBES

[75] Inventors: Charles A. Pelletier, Bethesda; William E. Gonso, Jr., Fredrick; Douglas S. Cameron; Patrick R. Leonard, both of Gaithersburg, all of Md.

[73] Assignee: Science Applications International Corporation, La Jolla, Calif.

[21] Appl. No.: 365,369

[22] Filed: Apr. 5, 1982

[51] Int. Cl.$^3$ ............................................. G01M 3/22
[52] U.S. Cl. ................................... 73/40.5 R; 73/40.7
[58] Field of Search ...................... 73/40.7, 40, 40.5 R

[56] References Cited

U.S. PATENT DOCUMENTS

| | | | |
|---|---|---|---|
| 2,852,459 | 9/1958 | Williamson | 73/40.5 R |
| 3,975,943 | 8/1967 | Brachet | 73/40.7 |
| 4,226,113 | 10/1980 | Pelletier et al. | 73/40.7 |

Primary Examiner—Gerald Goldberg
Assistant Examiner—Hezron Williams
Attorney, Agent, or Firm—Bruno J. Verbeck; Michael L. Slonecker

[57] ABSTRACT

A system and method for detecting, and then specifically locating, a leaking tube or tubes from among a plurality of tubes which extend through a chamber and are accessible at their opposite ends from outside the chamber, such as, for example, cooling tubes of a steam condenser. The system includes a reservoir containing a supply of tracer fluid, a plurality of conduits forming a matrix which releases tracer fluid in a controllable manner into predetermined groups of tubes without interruption of the flow of normal process fluid through all of the tubes, and a detector for sampling process fluid normally flowing through the chamber for the presence of tracer fluid, the detection of tracer fluid being indicative of a leak and the capability of controllably releasing tracer fluid to the tubes permitting the localization of which specific tube is leaking. The tracer fluid-communicating conduits are preferably formed from elastomeric material and include resilient slits through which tracer fluid is released into the tubes.

18 Claims, 11 Drawing Figures

SYSTEM AND METHOD FOR LOCATING LEAKING TUBES

BACKGROUND OF THE INVENTION

The present invention generally relates to the detection and localization of a leaking tube from among a plurality of such tubes. While the concept embodied in the invention is generally applicable for detecting leaks within any system having tubes extending across an enclosed chamber, it is particularly well suited for detecting leaks in condenser tubes forming part of a steam condenser.

By way of background, steam is utilized in many power generating systems to drive turbines. Such systems comprise a boiler, the turbine itself, and a condenser which are all interconnected into a single closed-loop system. The boiler is used to produce steam which is, in turn, circulated to the turbine for driving same. The spent steam, together with condensate formed as a result of passage through the turbine, is then circulated through the condenser wherein the steam component thereof condenses back to water. The water exiting the condenser is next returned to the boiler where it is converted into steam and then recirculated to again drive the turbine.

Power generating systems of the kind just described typically utilize a condenser which includes a large plurality of condenser tubes, in the order of several thousand, extending between and supported by a spaced pair of plates or sheets (hereinafter referred to as tube sheets). All such condenser tubes are positioned within an enclosed condensation chamber which receives the combined steam and water from the turbine. The tube sheets themselves form part of the wall structure of the condensation chamber and the condenser tubes are connected to the tube sheets in a manner rendering them accessible at their opposite ends from the outside of the condensation chamber.

Cooling of the steam to convert it to water is facilitated by circulating cooling water through the condenser tubes. This typically involves withdrawing water from an adjacent lake or river, communicating the water through one end of the condenser tubes, and then discharging the water from out the opposite end of the tubes back into the lake or river. Because such sources of cooling water typically contain suspended and dissolved solids and other contaminants in admixture therewith, it is necessary to ensure against cooling water intrusion into the closed-loop system to thereby alleviate corrosion and other like problems. Intrusion of cooling water may occur if one of the condenser tubes develops a leak along a portion located within the condensation chamber. Similarly, a leak developing along the seam between the tube sheet and the condensation chamber may also result in cooling water intrusion. By virtue of the vacuum produced in the chamber as a result of the condensation process, certain of the cooling water may be drawn through the leaks and thereby contaminate the closed-loop system water used to produce steam.

Heretofore, all methods for detecting and locating leaks in condenser tubes have required shutting down and removing off-line at least a portion of the power generating system, thereby resulting in the loss of energy capacity. While many present-day systems employ a plurality of condensers therein, in some of those systems the removal of even only one condenser from on-line operation requires shut down of the entire system.

In addition to the resultant loss of energy producing capacity, the prior art methods also suffer from the drawbacks that they are difficult to carry out, time consuming to perform, and, in most instances, require the presence of personnel within the inhospitable environment of the condenser itself in order to locate leaks.

One such prior art method is disclosed in Pelletier et al., U.S. Pat. No. 4,226,113, issued Oct. 7, 1980. Briefly, that patent discloses a method for detecting condenser tube leaks wherein the condenser is first removed off-line and then individual groups of condenser tubes are treated for leaks by directing therein a discrete amount of tracer gas such as, for example, helium. In practicing the method, suitable pump means are connected to one end of the condenser tubes to create a vacuum therein and thereby cause the tracer gas to flow through the tubes. If one of the tubes within the group of tubes being tested has a leak, a portion of the tracer gas will escape from the tube through the leak into the condensation chamber. Suitable means are provided for sampling the atmosphere within the condensation chamber surrounding the tubes to detect the presence therein of any tracer gas which may have been leaked.

A variant form of the Pelletier et al. method is disclosed in Frei, U.S. Pat. No. 3,425,264, issued Feb. 4, 1969. In the Frei method the condenser is removed off-line and both the condensation chamber and the condenser tubes are cleared of process fluids. Thereafter, suitable pump means are utilized to evacuate the tubes to a pressure lower than the chamber pressure, and simultaneous therewith a tracer gas is injected into the chamber. If a leak is present in any of the condenser tubes the leaking tube will draw in the tracer gas and subsequent sampling of each of the tubes will reveal which, if any, of them are leaking.

Another method for detecting leaking tubes is disclosed in Brachet, U.S. Pat. No. 3,975,943, issued Aug. 24, 1976. Briefly, Brachet discloses a method for detecting steam and/or water leakage from circulation tubes surrounded by an alkaline molten metal. More specifically, the apparatus to which the method is applied is a heat-exchanger including a plurality of circulation tubes having water and/or steam flowing therethrough. The circulation tubes are arranged in predetermined groups whereby each group of circulation tubes is separately enclosed between a spaced pair of baffles forming a compartment or channel through which liquid sodium flows. With the heat exchanger on-line and in full operation, the liquid exiting all of the channels is monitored for the presence of water, indicative of a leaking tube. In the event that the presence of water is detected, then various groups of circulation tubes are successively removed off-line, drained of water and/or steam, and then pressurized with an inert gas. Assuming that the group of tubes removed off-line contains the leaking tube, then sampling of the liquid sodium would reveal the absence of water, and, therefore, it would be known that the leaking tube was among the group then being held off-line. The tube from that group actually leaking is then determined by bringing the entire apparatus back on-line, and then individually sampling the liquid sodium flowing through each channel which has one of the tubes from the group positioned therein to thereby locate which of the tubes is leaking. While the Brachet method represents an improvement over the other methods previously discussed in that it permits the majority of the heat-exchanger to remain on-line during the carrying out of the method, it too nevertheless suffers from the drawback that at least some of the apparatus must be taken off-line in order that the leaking tube may be detected. Furthermore, it will be readily appreciated that Brachet is generally limited to apparatus having only a few tubes as compared to the several thousand typically present in a steam condenser. The Brachet method also suffers from the additional drawback that it is incapable of detecting a leaking tube in the case where the fluid flowing through the tubes and through the channels is of the same chemical composition.

In view of the foregoing drawbacks residing in the prior art, it is the primary object of this invention to provide an improved leak detection system and method which enables power plant personnel to quickly and accurately locate one or more leaking tubes without having to remove any part of the power plant off-line.

Another object of this invention is to provide a leak detection system which is both rugged and durable, as well as being both easy and inexpensive to operate and maintain.

A still further object of this invention is to provide a leak detection system and method which only minimally, if at all, interferes with the normal operation of a power generating system, and to the greatest extent practicable is compatible with such power generating systems to thereby alleviate the possibility of damage to the system such as may be caused by galvanic corrosion and other like deleterious phenomena.

It is also an object of this invention, that, once the leaking tube(s) has been located, the subsequent occlusion of that tube can be performed rapidly and efficiently with only minimal off-line time for the power generating system.

It is also an object of this invention to provide a leak detection system which is capable of operation despite the disposition thereof within cooling water having comtaminants admixed therewith, which contaminants might otherwise adversely effect the leak detection system reliability.

Another object of this invention is to provide a leak detection system and method which utilizes normal fluid flow through condenser tubes, or the like, and a condensation chamber, or the like, to carry detectable tracer fluid.

Yet another object of this invention is to provide both a leak detection system and method which uses a gas as the tracer fluid, and which is both accurate and reliable regardless of the orientation of the condenser tubes.

SUMMARY OF THE INVENTION

The present invention comprises both a system and method for identifying one or more leaking tubes from among a plurality of tubes. A characterizing feature of the invention resides in the fact that the leak can be located while the tube-containing device remains on-line and in full operation. This feature is obtained by using the operation fluid normally circulating through the tubes as a carrier medium for tracer fluid. While the preferred form of the invention is especially adapted for cooling water leaks from condenser tubes into the steam space of a condensation chamber, it is readily adaptable for locating leaks in other similar devices wherein the fluid communicating through the tubes and the fluid communicating through the chamber surrounding the tubes have substantially the same chemical composition. The invention is, of course, adaptable for locating leaks in devices wherein fluids of different chemical composition flow, repectively, through the tubes and chamber.

The system comprising this invention is obtained by forming a matrix of tracer fluid delivery tubes on the tube sheet of a condensation chamber which supports the inlet end portions of the condenser tubes through which cooling water is received. The matrix is formed by first connecting each delivery tube to a predetermined group of condenser tubes in such a manner that tracer fluid is substantially simultaneously released into the inlets of the condenser tubes comprising the predetermined group and carried along the lengths thereof by the cooling water. Each condenser tube in a predetermined group is also contained in another different predetermined group and connected in a like manner to a delivery tube for receiving tracer fluid released to said another group. Each of the matrix-forming delivery tubes are connected through an appropriate valve network to a remote source or reservoir of tracer fluid. By means of said valve network, the tracer fluid may be controllably released to each delivery tube and, hence, to each predetermined group of condenser tubes. The system of this invention also includes sampling means for analyzing the fluid contained in the chamber surrounding the condenser tubes for the presence of tracer fluid, the detection of which is indicative that a leak exists.

The foregoing system is utilized to practice the method of this invention by sequentially releasing tracer fluid into at least one of the predetermined groups of condenser tubes, and then sampling the fluid in the condensation chamber after each such release for the presence of tracer fluid. The detection of tracer fluid in the chamber fluid is indicative that at least one of the condenser tubes in the predetermined group then receiving tracer fluid is leaking. The leaking tubes are then specifically identified by again releasing tracer fluid to each of the other predetermined groups containing therein one of the condenser tubes from the predetermined group identified as having a leaking tube or tubes. Again, the chamber fluid is analyzed subsequent to each release for the presence of tracer fluid and the detection thereof results in the accurate determination of which tube or tubes are leaking. Having identified the leaking tube or tubes, then the condenser is removed off-line, the condenser tubes are drained of fluid, and the tubes identified as having leaks are appropriately occluded at the opposite ends thereof.

The present invention also comprises new and improved means for releasing tracer fluid into a solid contaminants-containing fluid while avoiding the problem of said contaminants fouling, or otherwise occluding, the aperture through which the tracer fluid is released. Briefly, this aspect of the invention is obtained by forming the tracer fluid delivery tubes from an elastomeric material, and then providing a slit, in lieu of a fixed aperture, through a sidewall portion of the delivery tubes. Because of the resiliency of the elastomeric material, the slit opens in response to the communication of tracer fluid therethrough, and closes upon the cessation of tracer fluid flow.

DETAILED DESCRIPTION OF THE DRAWINGS

So that this invention is more clearly understood, reference is now made to the several accompanying drawings wherein like reference numerals refer to like parts throughout the several views and wherein.

DETAILED DESCRIPTION OF THE PREFERRED EMBODIMENT

Figure 1:
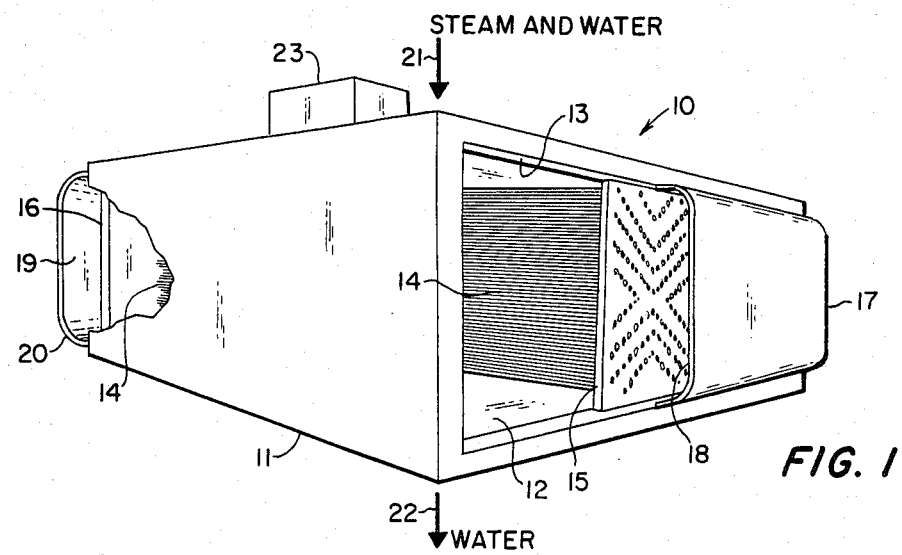
FIG. 1 is a partial, cut-away, perspective view of a somewhat typical condenser to which this invention relates.

Coming now to FIG. 1, therein is illustrated a somewhat typical condenser of the type used to convert steam to water, the condenser being generally denoted by the reference numeral 10. Condenser 10 includes an external housing 11 within which is defined an internal condensation chamber 12. Housing 11 includes an opening 13 across one end and another like opening (not shown) across its opposite end. Communicating between said openings and through said chamber are a large plurality of condenser tubes 14. Said tubes are each supported at their opposite ends by a front tube sheet 15 and rear tube sheet 16, said tube sheets being welded or otherwise secured about the perimeters thereof to said openings across housing 11. It should be noted from FIG. 1 that the interior of each condenser tube 14, as supported by tube sheet 15, is rendered accessible from the outside of housing 11. While not shown, it will be understood that condenser tubes 14 are supported by tube sheet 16 in substantially the same manner.

Connected to housing 11 and disposed over tube sheets 15 and 16, respectively, are plenums 17 and 19. Plenum 17 is provided with an inlet 18 for admitting cooling water therein, and plenum 19 is provided with an outlet 20 for discharging cooling water therefrom.

In actual operation condenser 10 is connected by suitable pump means (not shown) to a remote source of cooling water, typically a local lake or river. Said cooling water is circulated through condenser 10 by directing same through inlet 18 of plenum 17, and thence into each of the condenser tubes 14 supported by front tube sheet 15. Cooling water received by each of said condenser tubes communicates through said tubes, is discharged through the opposite ends thereof into plenum 19, and is then discharged through outlet 20 and back to the cooling water source.

As the cooling water circulates through condenser tubes 14, a combination of steam and water is introduced into condensation chamber 12 through an inlet (not shown), as generally denoted by the directional arrow 21. This combination of steam and water is directed through chamber 12 and across condenser tubes 14 thereby causing the steam to condense and collect in the lower portion of chamber 12 as water. The water is thereafter drawn from chamber 12 through an outlet (not shown), such as indicated by the directional arrow 22, and the water is then eventually reintroduced into a boiler (not shown) for subsequent reconversion into steam.

Condenser 10 also includes pump means 23 for removing and exhausting process gases which accumulate in condensation chamber 12. Means 23 is also utilized to facilitate the maintenance of the vacuum produced in chamber 12 as a result of the condensation of steam or water. As will be more clearly understood from the discussion which follows, both the vacuum within chamber 12 and pump means 23 are advantageously exploited in the practice of this invention.

Figure 2:
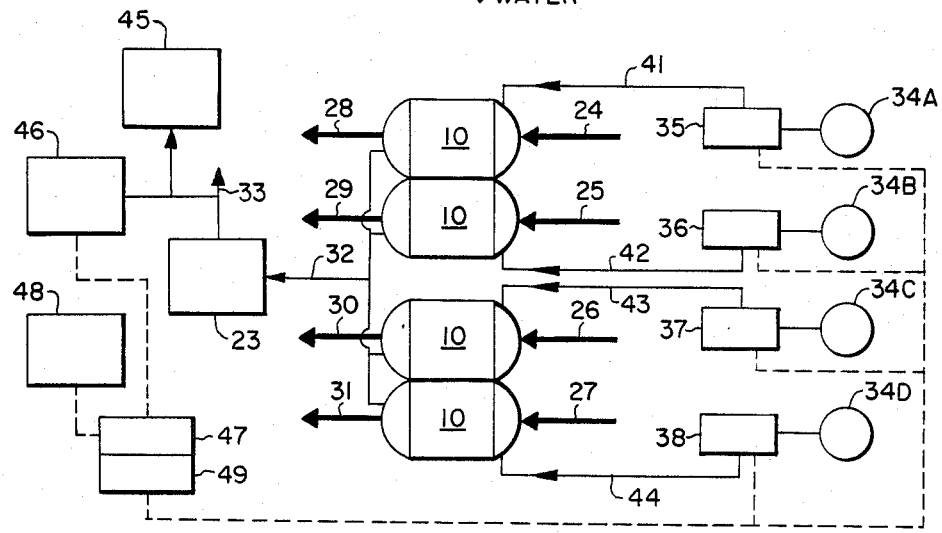
FIG. 2 is a schematic view of an on-line leak detection system in accordance with this invention.

A general overview and understanding of the leak detection system and method of this invention is provided by now referring to FIG. 2. As previously noted, most power generating systems employ a plurality of condensers for converting steam to water. FIG. 2 schemmatically illustrates such a power generating system. Also included in the figure are the several additional elements comprising the preferred form of this invention which enables power generating system personnel to quickly and accurately locate leaking condenser tubes.

Briefly, the power generating system shown in FIG. 2 comprises a plurality of condensers 10 of the type previously discussed. Said condensers are connected in pairs, each of said pairs in turn being connected in parallel for concurrent operation. Directional arrows 24 through 27 represent cooling water input to each condenser 10 for circulation through the condenser tubes (not shown), and directional arrows 28 through 31 represent cooling water discharge from the condensers. Process gases accumulating within the condensation chambers of each condenser 10 are withdrawn through line 32 by pump 23, said means typically comprising a conventional vacuum pump or stream jet air ejector. It should be noted that though line 32 is commonly connected to each condenser 10, the usual practice is to provide a pump means 23 for each individual condenser 10. Assuming that the withdrawn process gases are suitable for direct release to the atmosphere, pump means 23 may be used to affect said release, such as represented by line 33. Otherwise, such gases may be directed through line 33 to a suitable post-treatment system (not shown). To the extent just described, FIG. 2 is representative of a typical multi-condenser power generating system. The leak detection system comprising the present invention is also shown in the figure and includes a plurality of remote reservoirs 34A through 34D containing tracer gas. Valve means 35 through 38 are connected to receive tracer gas from one of said reservoirs. Each of said valve means is in turn connected to a condenser 10 for communicating tracer gas thereto through one of lines 41 through 44. As will be more fully explained hereafter, tracer gas communicated to each condenser is released in a predetermined manner into the inlet ends of one or more condenser tubes wherein tracer gas is rapidly entrained into the condenser tubes by virtue of the circulation of cooling water through said tubes. In the event that a leak exists through one of the condenser tubes, some of the tracer gas-containing cooling water will be drawn into the condensation chamber wherein said tracer gas will separate from the cooling water and become admixed with the process gases.

Connected to either of the line 32 or 33 is pump means 45 for producing a vacuum which withdraws a sample of the process gases. Detector means 46 are also included for analyzing said withdrawn sample for the presence of tracer gas. Detection of tracer gas by means 46 is indicative of the fact that a leak into the condensation chamber exists.

While the system and method of this invention are adaptable for manual operation, the preferred embodiment includes a digital computer 47 connected to receive the output from detector means 46. Readout means 48 are provided to alert personnel that the presence of tracer gas has been detected. Computer 47 is programmed with an appropriate set of instructions for controlling the operation of valve means 35 through 38. Interface means 49 are connected to computer 47 for converting the computer output signals into appropriate electrical signals for operating said valve means.

In a typical condenser tube arrangement such as shown in FIG. 1 approximately 10,000 condenser tubes are supported by a tube sheet measuring about 12′ wide by 25′ high. Each condenser tube has a nominal inner diameter of about ⅞ in. and a nominal outer diameter of about 1.0 in. Based upon these somewhat typical dimensions it will be appreciated that a relatively limited amount of space is available for forming a leak detection system capable of releasing tracer gas to each condenser tube. Furthermore, the flow pattern of cooling water into the plenum covering the front tube sheet which supports the condenser tubes is important for designing an arrangement of condenser tubes. Thus, it will also be appreciated that a leak detection system should be sufficiently innocuous in situ such that it only minimally interferes with said flow pattern.

Figure 3:
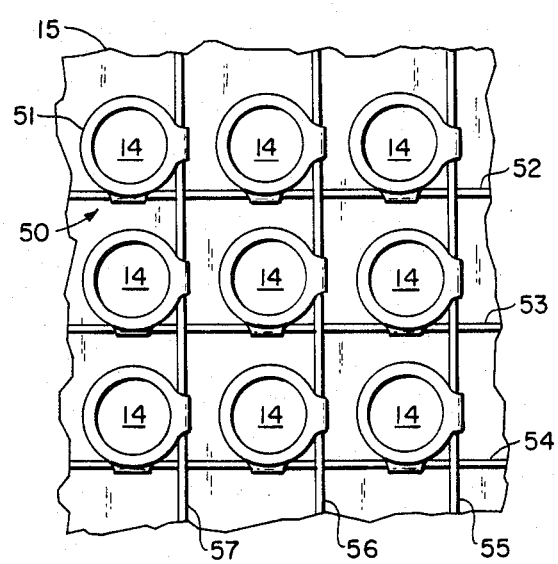
FIG. 3 is a partial-plan view of a condenser tube sheet illustrating the arrangement of condenser tubes into predetermined tube groups in accordance with the practice of this invention.
Figure 4:
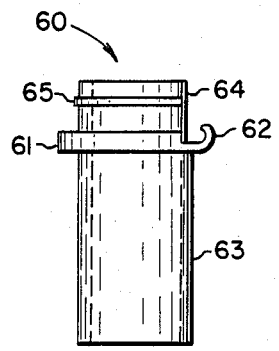
FIGS. 4 through 6 are various plan views of an insert adapted to connect a tracer fluid delivery tube to a condenser tube.

The foregoing considerations are taken into account in the leak detection system of this invention, and said system is best understood by now referring to FIGS. 3 through 10. More specifically, FIG. 3 illustrates a partial plan view of an arrangement of condenser tubes 14 supported about the inlet end portions thereof by tube sheet 15. The condenser tubes 14 themselve are masked from view in the figure by the novel arrangement of means 50 for releasing tracer gas in a predetermined manner into the inlets of each condenser tube 14, said means comprising a part of the instant invention. Means 50 comprises a tubular member 51 inserted into the inlet of each condenser tube 14. Each member 51 is in turn connected to a matrix defined by delivery tubes or conduits 52 through 57. While not shown, it will be understood that said delivery tubes or conduits are connected through an appropriate network of valves to a remote reservoir of tracer gas in a manner such as illustrated in FIG. 2. Each conduit 52, 53, and 54 is connected to a different predetermined group of condenser tubes 14. Each condenser tube 14 in said predetermined group is in turn connected to one of the conduits 55, 56, and 57, and is thereby included within another different predetermined group of condenser tubes 14. It will be noted in the figure that the connection of said condenser tubes to said conduits results in each of said condenser tubes being connected to two different of said delivery tubes or conduits. Therefore, each of said condenser tubes is included among two different predetermined groups of condenser tubes.

The leak detection system shown in FIG. 3 permits the rapid detection and localization of a leaking condenser tube by sequentially releasing tracer gas from each conduit 52 through 54 into the inlets of the predetermined groups of condenser tubes 14 connected thereto. For example, if tracer gas is released into only the group of the condenser tubes connected to conduit 52, then the appearance of tracer gas in the condensation chamber process gases is indicative of the fact that a least one of the tubes of that group is leaking cooling water into the chamber. The determination of which tube or tubes is actually leaking is made by then releasing tracer gas in sequence through each of conduits 55, 56, and 57. After each such release the process gases are monitored for the presence of tracer gas, and detection of tracer gas thereby specifically identifies the leaking tube or tubes.

Figure 7:
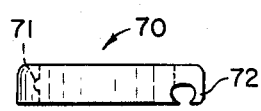
FIGS. 7 through 9 are various plan views of a collar adapted for connecting a tracer fluid delivery tube to the insert shown in FIGS. 4 through 6.
Figure 8:
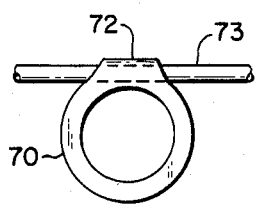
Figure 9:
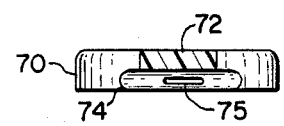

The preferred embodiment of tubular member 51 is shown in FIGS. 4 through 9, said member comprising a tubular insert 60 (FIGS. 4–6) and collar 70 (FIGS. 7–9). Insert 60 includes shoulder means 61 having a lip 62 extending outwardly therefrom for supporting delivery tube 68. Projecting from one side of shoulder means 61 is a tubular extension 63 of a shape substantially complemental to the inlet end portion of a condenser tube (not shown) whereby said tubular extension may be inserted within and supported by the latter. Projecting from the opposite side of shoulder means 61 is a second tubular extension 64 having formed about its periphery an annular protrusion 65. An aperture 66 is provided through tubular extension 64, and the dimensions of lip 62 are selected whereby a portion of delivery tube 68 is tightly, snugly secured across aperture 66. As will later be more fully discussed, tracer gas is released from delivery tube 68 and communicates through aperture 66 into insert 60, whereupon said tracer gas is rapidly entrained into the condenser tube by virtue of the circulation of cooling water.

Collar 70 comprises an annular member having an internal surface of a shape substantially complemental to the external shape of tubular extension 64. Groove 71 is provided for receiving protrusion 65 whereby insert 60 and collar 70 may be urged into snap-locked connection. Extending outwardly from collar 70 is a lip 72 of a size sufficient to support delivery tube 73. Lip 72 is partially formed by tangentially cutting across collar 70, such as generally denoted by reference numeral 74, to a depth sufficient to form aperture 75. In this manner lip 72 tightly, snugly secures a portion of delivery tube 73 across aperture 75.

Figure 5:
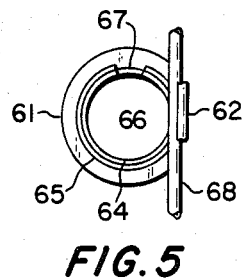
Figure 6:
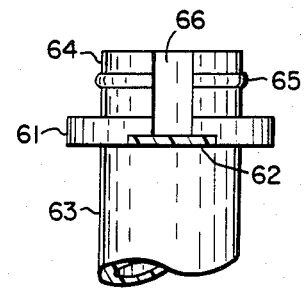

Referring specifically to FIG. 5, a second aperture 67 is also provided through tubular extension 64. Aperture 67 is adapted for coaxial alignment with aperture 75 whereby tracer gas released from the delivery tube supported by collar 70 communicates through apertures 75 and 67 for entrainment into the condenser tube. It will be noted from FIG. 5 that apertures 66 and 67 are at approximately right angles relative to the longitudinal axis of tubular insert 60. Their relative positioning, however, is not limiting of this invention and depends upon the angle formed by the intersection of delivery tubes 68 and 73. Accordingly, aperture 67 is provided through tubular extension 64 at a position which takes into account said angle of intersection.

Figure 10:
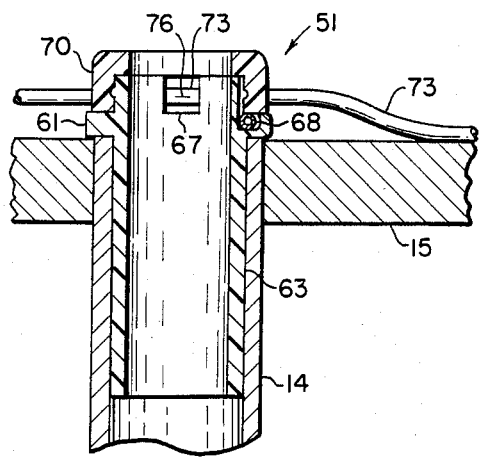
FIG. 10 is a partial, cross-sectional view showing the insert of FIGS. 4 through 6 and collar of FIGS. 7 through 9 as connected to a condenser tube and tracer fluid delivery tubes.

FIG. 10 is a cut-away plan view of tubular member 51 and tracer gas delivery tubes 68 and 73 as connected to a condenser tube 14, said condenser tube, in turn, being supported about a portion of its inlet end by front tube sheet 15. This arrangement enables cooling water to circulate through condenser tube 14 by initially entering through collar 70 and then discharging into said condenser tube from tubular extension 63. Delivery tubes 68 and 73 are connected to release tracer gas into the cooling water as it communicates through tubular member 51. Release of tracer gas in this manner ensures that the gas is not inadvertently entrained into other adjacent condenser tubes.

Tubular member 51 is preferably formed from a durable, high-strength plastic material such as, for example, Zytel, (a registered trademark) ST801 Nylon, available from E. I. Dupont De Ne mours & Company, Wilmington, Delaware. Forming tubular member 51 from plastic material, as opposed to metal, is preferred for reasons of both cost and the desirability of minimizing the possibility of galvanic corrosion of the tube sheet and condenser tubes. An adhesive such as, for example, Pliobond (a registered trademark) 20 or 30, available from the Goodyear Tire and Rubber Company, may be used to secure each tubular member 51 to a condenser tube 14.

Insofar as the tracer gas delivery tubes themselves are concerned, it was discovered during the course of work involved with this invention that the utilization of a fixed aperture through the delivery tubes for releasing gas therethrough into the inlet end portions of the condenser tubes was not altogether satisfactory. The reason for this resides in the fact that various contaminants carried by the cooling water have a tendency to become lodged within the apertures and thereby hinder tracer gas release. This problem was overcome by forming the tracer gas delivery tubes from an elastomeric material, and then providing a longitudinal slit through the delivery tubes in lieu of a fixed aperture. This feature of the present invention is illustrated in FIG. 10 wherein tracer gas delivery tube 73 is shown to have a longitudinal slit 76. The inherent resiliency of elastomeric material permits slit 76 to open and close in response to the communication of tracer gas therethrough, and the opening and closing of slit 76 functions in the manner of self-cleaning valve which dislodges from slit 76 cooling water contaminants lodged therein. Delivery tubes formed from such an elastomeric material are commercially available from Thermoplastics Scientifics, Inc, of Warren, N.J., and are sold by that company under the registered trademark Microline. In the preferred embodiment each delivery tube has a nominal inner diameter of about 1/16 in., a nominal outer diameter of about ⅛ in., and each slit has a length of about 2 to 3 mm.

Retrofitting of a typical condenser with the leak detection system of this invention requires the connection of each condenser tube to the matrix of delivery tubes formed in the manner previously discussed. Due to the non-uniform spacing between adjacent condenser tubes supported by a tube sheet, and in view of the fact that the tracer gas delivery tubes themselves are flexible because of their formation from elastomeric material, it is preferred to secure portions of the tracer gas delivery tubes to the tube sheet itself so that the delivery tube matrix is substantially rigid. Briefly, rigidizing of the matrix involves first cleaning the tube sheet, such as by conventional blasting with glass beads, to remove scale and other like substances adhereing to the tube sheet. The cleaned tube sheet surface is then overlayed with a protective coating such as, for example, GLID-GUARD (a registered trademark) brand Epoxy Self-Priming Mastic No. 5256, manufactured by the Glidden Company of Cleveland, Ohio. The tracer gas delivery tubes are then secured to the coated tube sheet by an adhesive such as, for example, DPAD-6298-3X Polyurethane adhesive manufactured by Conap of Olean, New York. The connection of a delivery tube to the tube sheet is shown in FIG. 10.

The tracer gas utilized for practicing this invention preferrably comprises either helium or a halogenated gas such as, for example, sulfur hexafluoride, perfluoromonomethylcyclohexane, perfluorodimethylcyclohexane, and perfluorodimethylcyclobutane. These gases are insoluble in water and, therefore, separate from cooling water leaked into the condensation chamber and become admixed therein with the process gases. The ability of this invention to detect a leaking tube depends, of course, upon the threshold sensitivity towards tracer gas of the detector means used to analyze the process gases for the presence of said tracer gas. Said threshold sensitivity represents a practical limitation due to the necessity of having to employ relatively small diameter delivery tubes and, therefore, relatively small gas flows to each condenser tube. The limitation is particularly acute in the situation wherein the condenser tubes extend substantially horizontally across the condensation chamber. The reason for the limitation resides in the fact that the tracer gas, due to its non-solubility and inherent buoyancy, exhibits a tendency to rise upwardly in a vertical column of water. Thus, the problem becomes one of releasing tracer gas in sufficient quantity so that cooling water leaking from a condenser tube, whether the leak be from the uppermost, lowermost, or any intermediate position therebetween about the circumference of the condenser tube, carries sufficient tracer gas therewith which is detectable by the tracer gas detector means.

In a typical steam condenser cooling water circulates though 1 in. diameter condenser tubes at a rate of about 25 gallons/minute and a velocity of about 5 to 10 feet/second. The turbulence in a condenser tube is porportional to the Reynolds number, and in a steam condenser operating under the typical conditions just described the Reynolds number is about 20,000. Prototype testing of this invention revealed that releasing a tracer gas, detectable in quantities of about one part in $10^{10}$ parts of gas, at the rate of about 50 ml./min. into a condenser tube having cooling water circulating therethrough under typical conditions results in sufficient mixing of the tracer gas with cooling water to enable the detection of leaks as little as 0.001 gallons/min. Of course, the use of a tracer gas detectable in lesser concentrations or of more sensitive detectors will permit the detection of even smaller leaks.

The release of tracer gas into a tracer gas delivery tube will cause each of the several slits through that delivery tube to release tracer gas into each of the condenser tubes within the predetermined group connected thereto. To avoid the problem of possible cooling water intrusion into the tracer gas delivery tube upon the termination of tracer gas release, the preferred embodiment may include a remote source of purified water releasable into each tracer gas delivery tube upon the termination of tracer gas flow. The purified water is continuously released through the slits to thereby prevent cooling water intrusion. The purified water is removed from the tracer gas delivery tubes by virtue of tracer gas communication therethrough.

Figure 11:
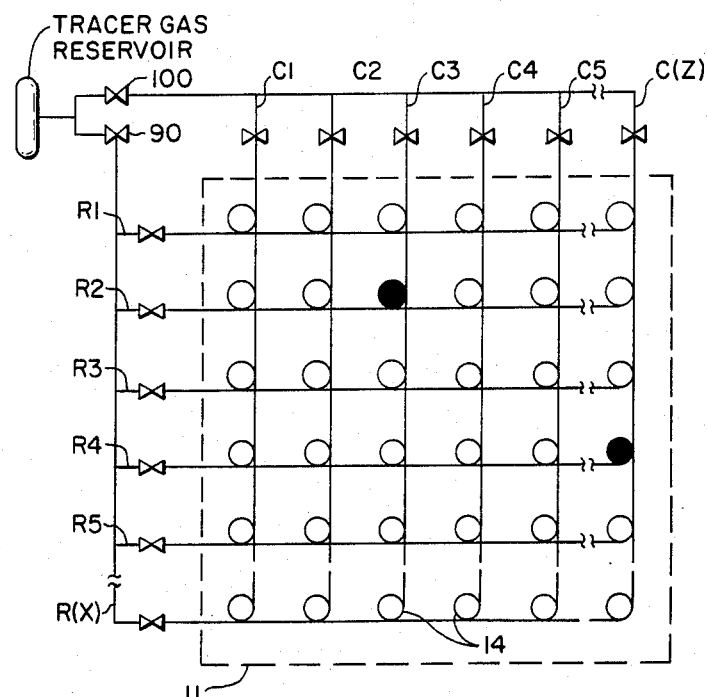
FIG. 11 is a schematic view of an on-line leak detection system in accordance with this invention to illustrate the method thereof.

Having described the preferred form of the leak detection system comprising this invention, reference is now made to FIG. 11 which shows a schemmatic view of said system and illustrates the method by which a leaking tube or tubes is detected. It will be recalled from the discussion relating to FIG. 2 that tracer gas is communicated from a remote reservoir into each condenser by means of an appropriate valve network. FIG. 11 illustrates a suitable valve network comprising valve 90 connected for communicating tracer gas from a remote reservoir to a plurality of rows of tracer gas delivery tubes designated R1 through R(X). A second valve 100 communicates tracer gas to a plurality of columns of tracer gas delivery tubes designated C1 through C(Z). Each row R1 through R(X) and each column C1 through C(Z) has a valve associated therewith which permits tracer gas to flow into the individual rows and columns. The dashed line identified by the reference numeral 11 generally denotes the housing of the condenser and the condenser tubes extending through the housing are generally denoted by reference numeral 14. It will be noted that each row R1 through R(X) of tracer gas delivery tubes is connected to predetermined groups of condenser tubes 14. Similarly, each column C1 through C(Z) of tracer gas delivery tubes is connected to another different predetermined group of condenser tubes 14. It will also be noted that no two condenser tubes 14 are included in the same horizontal row and vertical column.

For purposes of discussing the method of this invention, it will be assumed that X=100, and that the condenser tubes 14 which have been darkened in the figure each have a leak which is permitting cooling water to enter the condensation chamber. The preferred sequence for locating the foregoing leaking condenser tubes is as follows:

Initially, valve 100 is closed, valve 90 is opened, and the valves in rows 1 through 100 are opened. Tracer gas is then released into all of the horizontal rows. Immediately thereafter the process gases contained within the condensation chamber of housing 11 are analyzed for the presence of tracer gas. Assuming that tracer gas is detected within the proces gases, then the valves in rows 1 through 50 are closed, and tracer gas is again released. Assuming that tracer gas does not appear in the process gases, then it is clear that rows 51 through 100 do not contain leaks. The valves in rows 50 to 100 and 25 to 50 are then closed. Tracer gas is then released. Of course, in the given example tracer gas would appear in the process gases. Accordingly, the valves in rows 1 through 24 and 50 through 100 are closed and tracer gas is released. If tracer gas does not appear in the process gases then rows 25 through 100 do not contain leaking condenser tubes.

The valves in rows 12 through 100 are next closed, tracer gas again released, and said tracer gas would appear in the process gases. The valves in rows 1 through 11 and 25 through 100 are closed, tracer gas released, and tracer gas would not appear in the processed gases. Accordingly, rows 12 through 100 do not contain leaks. The method then continues with rows 1 through 6 and 12 through 100 being closed, tracer gas again being released, and the tracer gas would not appear in the process gases. Accordingly, rows 7 through 100 do not contain leaks. Next the valves in rows 1 through 3 and 7 through 100 are closed, and tracer gas is released. Tracer gas would appear in the process gases. The valves in rows 4 through 6 and 7 through 100 are then closed, tracer gas is released, and again tracer gas appears in the process gases. Therefore, a leak exists in one of the condenser tubes within rows 1 through 3 and 4 through 6.

The next step is to close the valves in all rows except rows 1 and 7 through 100. Tracer gas is released and does not appear in the process gases. Accordingly, it is now known that row 1 has no leaks. This step is then repeated opening only one row at a time from row 2 to row 6. The result will be to isolate the leaks to rows 2 and 4.

Valve 90 is then closed, Valve 100 is opened, and then the same procedure is utilized to isolate the leaking condenser tubes in terms of their position within the vertical columns, and the point of intersection between a leaking row and a leaking column is indicative of the fact that the condenser tube contained in each of them is one which is leaking.

While the preferred form of the means and method comprising this invention have been disclosed herein, it will be readily appreciated that various modifications can be made thereto without departing from the scope and spirit of the invention. Accordingly, all such modifications are contemplated as coming within the scope and spirit of the invention as defined in the appended claims.

What is claimed is:

1. A method for detecting and locating leaks from among a plurality of tubular members extending through a chamber and accessible at the opposite ends thereof from outside the chamber, there being a first process fluid communicating through said tubular members and a second process fluid communicating through said chamber, comprising the steps of releasing tracer fluid into one end of at least one tubular member while maintaining the flow of said first process fluid through all of said tubular members, and then sampling said second process fluid in said chamber for the presence of said tracer fluid.

2. A method as set forth in claim 1 wherein said tracer fluid is a gas.

3. A method as set forth in claim 2 wherein said gas comprises helium.

4. A method as set forth in claim 2 wherein said gas comprises a halogenated gas.

5. A method as set forth in claim 1 wherein said first and second process fluids are chemically the same and in either like or different phases.

6. A method as set forth in claim 5 wherein said first and second process fluids are water.

7. A method for detecting and locating leaks from among a plurality of tubular members extending through a chamber and accessible at the opposite ends thereof from outside said chamber, there being a first process fluid communicating through said tubular members and a second process fluid communicating through said chamber, comprising the steps of releasing tracer fluid into one end of a predetermined group of tubular members while maintaining the flow of said first process fluid through all of said tubular members, then sampling said second process fluid in said chamber for the presence of said tracer fluid, then, if said sampling step reveals the presence of said tracer fluid, sequentially releasing tracer fluid into each of said tubular members of said predetermined group and sampling said second process fluid in said chamber after each such release for the presence of said tracer fluid, thereby locating which of said tubular members is leaking.

8. A method as set forth in claim 7 wherein said tracer fluid is a gas.

9. A method as set forth in claim 8 wherein said gas comprises helium.

10. A method as set forth in claim 8 wherein said gas comprises a halogenated gas.

11. A method as set forth in claim 7 wherein said first and second process fluids are chemically the same and in either like or different phases.

12. A method as set forth in claim 11 wherein said first and second process fluids are water.

13. A system for detecting and locating leaks from among a plurality of tubular members extending through a chamber and accessible through the opposite ends thereof from outside said chamber, there being a first process fluid communicating through said tubular members and a second process fluid communicating through said chamber, comprising:
   (a) reservoir means containing a tracer fluid;
   (b) conduit means connected to said reservoir means for releasing said tracer fluid into one end of at least one tubular member while maintaining the flow of said first process fluid through all of said tubular members; and
   (c) detector means for sampling said second process fluid in said chamber for the presence of tracer fluid.

14. A system as set forth in claim 13 wherein said conduit means comprises a plurality of tubular conduits each connected to a predetermined group of said tubular members, each of said tubular members being uniquely associated with and connected to two of said tubular conduits whereby each of said tubular members is contained within two different of said predetermined groups.

15. A system as set forth in claim 14 wherein said tubular conduits are formed from elastomeric material, said tubular conduits having elongated slits disposed therethrough for releasing tracer fluid into said tubular members.

16. A system as set forth in claim 14 or claim 15 wherein said conduit means further comprises means insertable into one end of each of said tubular members for supporting said tubular conduits.

17. A device for releasing a first fluid into a contaminants-containing fluid, comprising reservoir means containing said first fluid and a tubular member connected to receive said first fluid from said reservoir means, a portion of said tubular member being disposed in said contaminants-containing fluid and having a slit disposed therethrough, said portion being formed of elastomeric material sufficiently resilient whereby, in response to said first fluid communicating therethrough, said slit is caused to open and release said first fluid into said contaminants-containing fluid.

18. A device as set forth in claim 17 wherein said first fluid is a gas and said contaminants-containing fluid is a liquid.

* * * * *